(12) United States Patent
Hiraguchi

(10) Patent No.: US 6,854,680 B2
(45) Date of Patent: Feb. 15, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 98 days.

(21) Appl. No.: 10/446,832

(22) Filed: May 29, 2003

(65) Prior Publication Data

US 2003/0222169 A1 Dec. 4, 2003

(30) Foreign Application Priority Data

May 29, 2002 (JP) ........................................ 2002-156426

(51) Int. Cl.[7] .......................................... G11B 23/107
(52) U.S. Cl. .................................... 242/348.2; 360/132
(58) Field of Search .......................... 242/348, 348.2; 360/132

(56) References Cited

U.S. PATENT DOCUMENTS 5,570,252 A 10/1996 Sumner et al.
6,663,036 B1 * 12/2003 Ishihara et al. .......... 242/348.2

* cited by examiner

Primary Examiner—John Q. Nguyen
(74) Attorney, Agent, or Firm—Sughrue Mion, PLLC

(57) ABSTRACT

A recording tape cartridge in which contact resistance, which is caused by a door and an inner wall of a case when the door is moved for opening and closing a case opening, is reduced. The case is rectangular and accommodates a reel for winding a tape. The opening is formed by cutting away a case side wall for drawing out a leader pin attached to a tape end portion. The door is formed in a circular arc form in plan view and rotates for opening and closing the opening. The door rotates around a rotation axis which is parallel to a reel rotation axis. The center of rotation of the door is positioned on an axis Y, which intersects a loading direction into a drive device, and a center of rotation of the reel is also positioned on the axis Y. Consequently, a degree of curvature of the door can be moderated, and thus sliding resistance between the door and the case can be reduced.

15 Claims, 12 Drawing Sheets

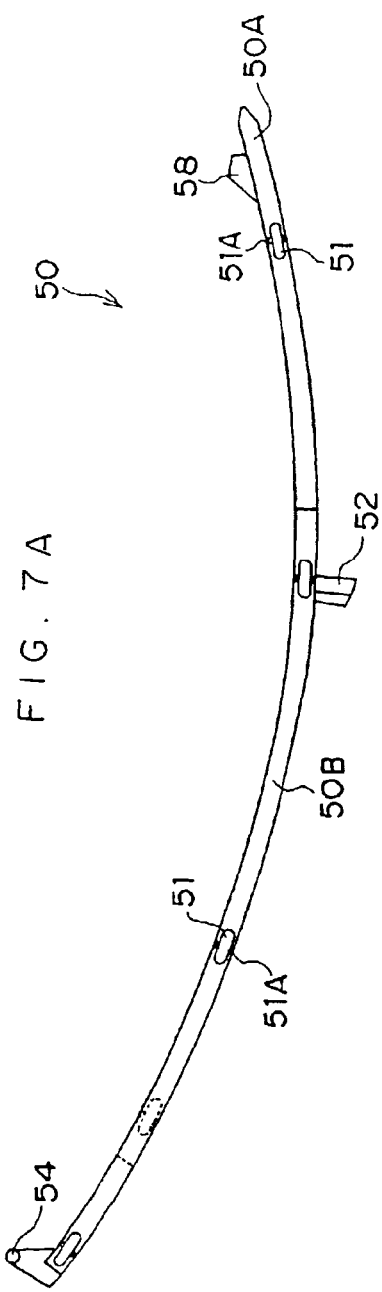
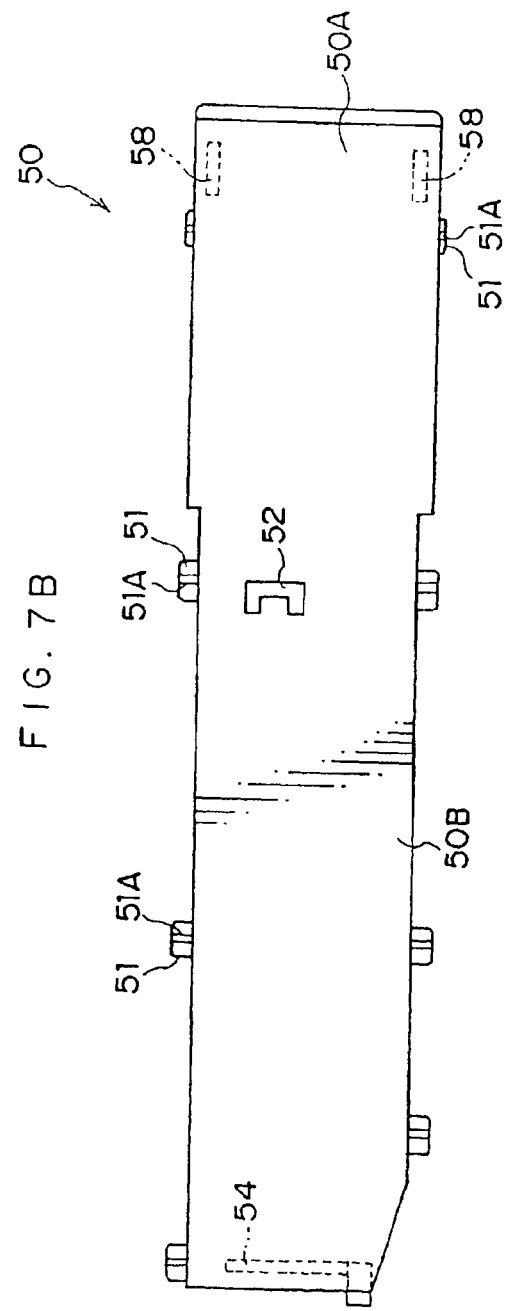

RECORDING TAPE CARTRIDGE

BACKGROUND OF THE INVENTION

1. Field of the Invention

The present invention relates to a recording tape cartridge which rotatably accommodates a single reel onto which recording tape such as a magnetic tape or the like is wound.

2. Description of the Related Art

Recording tapes such as magnetic tapes and the like are used as external recording media for computers and the like. Recording tape cartridges that accommodate a single reel on which a recording tape is wound take up little space when stored and can record large amounts of information, and are employed as such recording tapes.

An opening aperture is formed in a case of such a recording tape cartridge. The recording tape is drawn out through this opening, and wound around a drive device side winding reel. Accordingly, there have been various schemes in the prior art for preventing dust and the like from ingressing through the opening aperture and adhering to the recording tape.

In a recording tape cartridge 100 shown in FIG. 10, an opening 104 is formed in a side wall 102A of a case 102 (a side wall along a case loading direction A). This opening 104 is structured to be openable and closeable by a door 106 which slides along the loading direction.

Alternatively, in a recording tape cartridge 112 shown in FIG. 11, an opening 116 is formed in a front face wall 114A of a case 114 (a frontward wall which faces in the case loading direction A). This opening 116 is structured to be openable and closeable by a swivel-type door 118, which opens and closes by rotation about a shaft.

Further, in a recording tape cartridge 120 shown in FIG. 12, an opening 124 is formed by cutting away a corner portion of a case 122. The opening 124 is structured to be opened and closed directly by a leader block 126, which is a leader member connected to an end portion of a magnetic tape T.

However, for each of these cases, there have been demands to the effect that the door that opens and closes the opening of the case should be made to open and close more smoothly, by reducing contact resistance which is caused by the door and a ceiling plate or floor plate of the case.

SUMMARY OF THE INVENTION

In consideration of the circumstances described above, an object of the present invention is to provide a recording tape cartridge in which contact resistance, which is caused by a door and an inner wall of a case when the door is moved for opening or closing an opening of the case, is reduced.

In order to achieve the object described above, in accordance with a first aspect of the present invention, a tape cartridge which is insertable at a tape drive is provided, the tape drive being provided with an opening member which is operably engageable with the tape cartridge at a time of insertion of the tape cartridge and carrying out at least one of reading and writing of data, and the tape cartridge including: a case; a single reel rotatably provided in the case, the reel including a first center of rotation thereof; a tape unwindably attached to the reel; a tape access opening provided at the case; and a covering member which is reciprocally moveable along a circular arc-form movement path between a closed position for closing the tape access opening and an open position for opening the tape access opening, the circular arc including a predetermined radius thereof from a second center of rotation, wherein a position of the first center of rotation in a direction of the insertion of the cartridge substantially coincides with a position of the second center of rotation in the cartridge insertion direction.

In accordance with another aspect of the present invention, a tape drive for carrying out at least one of reading and writing of data at a tape cartridge which is insertable at the tape drive is provided, the tape cartridge including: a case; a single reel rotatably provided in the case, the reel including a first center of rotation thereof; a tape unwindably attached to the reel; a tape access opening provided at the case; and a covering member which is reciprocally moveable along a circular arc-form movement path between a closed position for closing the tape access opening and an open position for opening the tape access opening, the circular arc including a predetermined radius thereof from a second center of rotation, a position of the first center of rotation in a direction of insertion of the cartridge substantially coinciding with a position of the second center of rotation in the cartridge insertion direction, and the tape drive including an opening member which is capable of operably engaging with the tape cartridge at a time of insertion of the tape cartridge.

BRIEF DESCRIPTION OF THE DRAWINGS

FIG. 7A is a plan view showing a door which structures the recording tape cartridge relating to the embodiment of the present invention.

FIG. 7B is a side view showing the door.

DETAILED DESCRIPTION OF THE INVENTION

A recording tape cartridge 10 relating to an embodiment of the present invention will be explained on the basis of FIGS. 1 to 7. Firstly, general overall structure of the recording tape cartridge 10 will be explained. Then principal elements of the present invention, an opening 20 and a door 50 which serves as a covering member for opening and closing the opening 20, will be explained. For the sake of convenience of explanation, a loading direction of the recording tape cartridge 10 into a drive device, which is shown as arrow A, is referred to as a forward direction (a front side) of the recording tape cartridge 10, and the direction of an arrow B, which intersects arrow A, is a rightward direction.

Overall Structure of Recording Tape Cartridge

Figure 1:
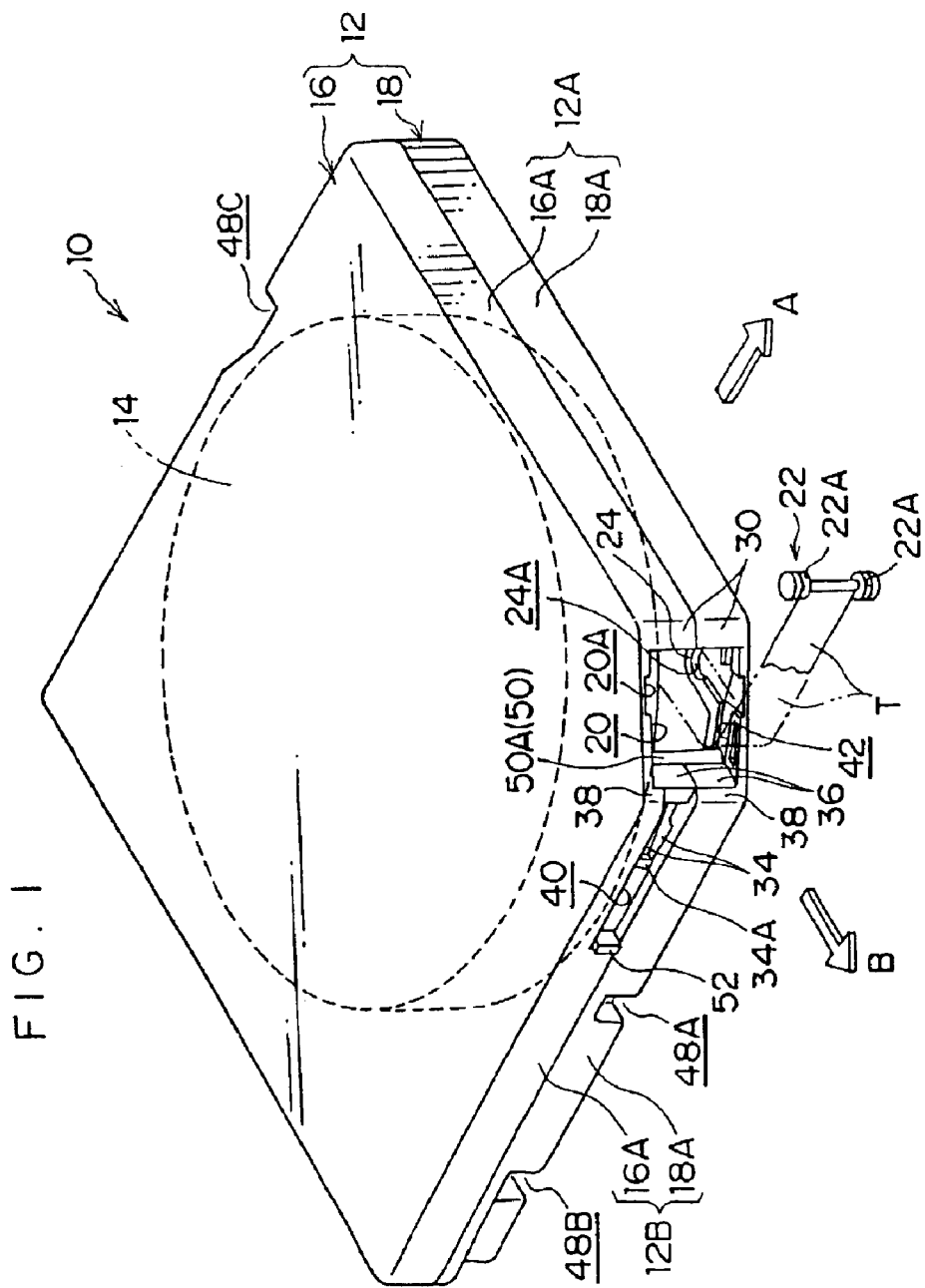
FIG. 1 is a perspective view showing overall structure of a recording tape cartridge relating to an embodiment of the present invention.
Figure 2:
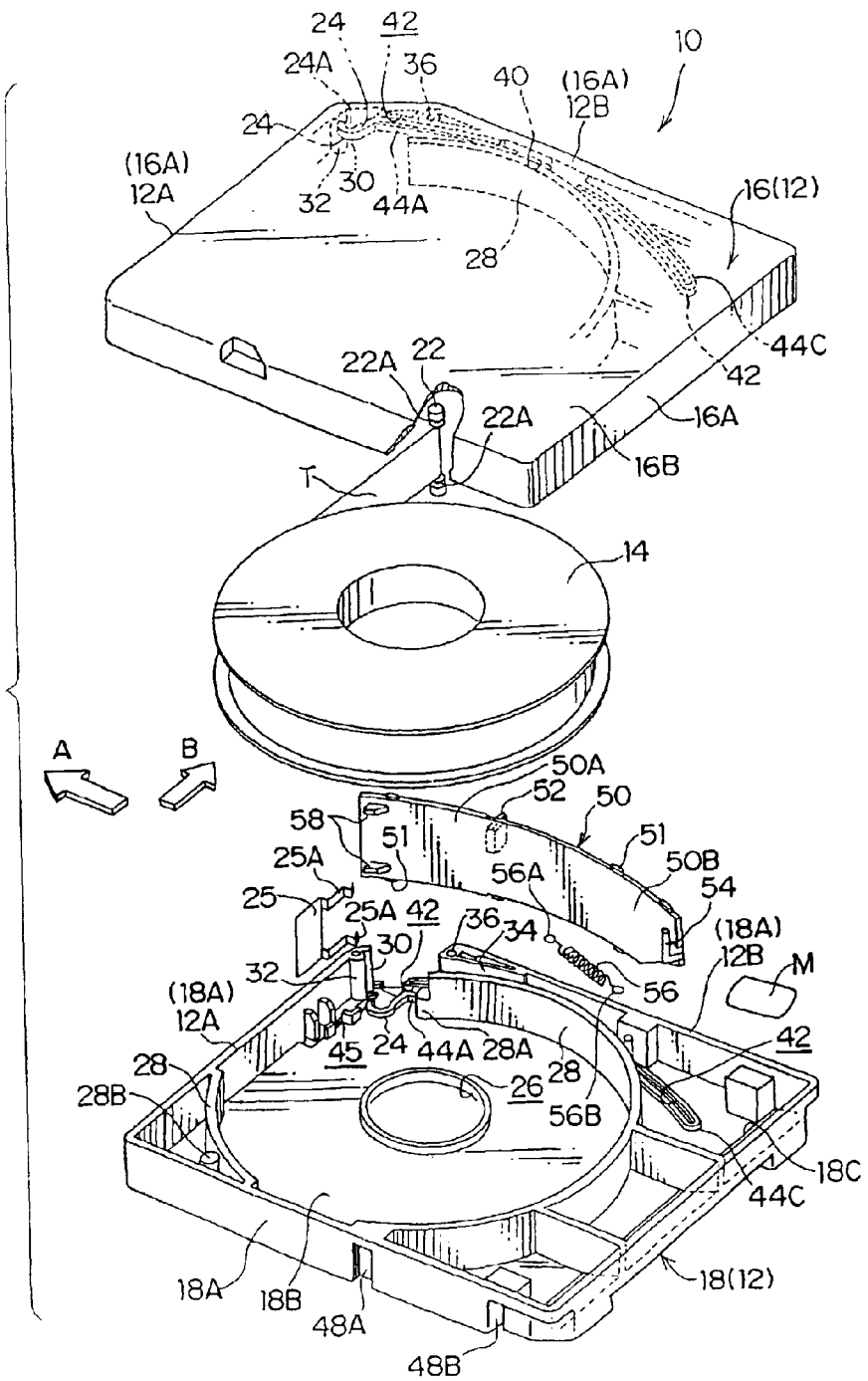
FIG. 2 is an exploded perspective view of the recording tape cartridge relating to the embodiment of the present invention.

FIG. 1 shows a perspective view of overall structure of the recording tape cartridge 10. FIG. 2 shows a schematic exploded perspective view of the recording tape cartridge 10.

As shown in these drawings, the recording tape cartridge 10 is structured to rotatably accommodate a single reel 14 in a case 12. The case 12 is substantially rectangular in plan view. A magnetic tape T is wound onto the reel 14. The magnetic tape T serves as a recording tape which is an information recording/replaying medium.

The case 12 is structured by matching up and joining two peripheral walls 16A and 18A of an upper case 16 and a lower case 18 to one another. A front-right corner portion of each of the upper case 16 and the lower case 18, which is a single corner portion at a front end side in the direction of loading into the drive device, is cut away. An accommodation space for the reel 14, onto which the magnetic tape T is wound, is provided inside the case 12. Hence, the cut away corner portions of the peripheral walls 16A and 18A of the upper case 16 and the lower case 18 serve as the opening 20 for drawing out the magnetic tape T.

A leader pin 22 is connected at a free end of the magnetic tape T which is to be drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms which open to the direction of arrow B, and both the end portions of the leader pin 22 are held at recess portions 24A of the pin stands 24 in a state in which the leader pin 22 is standing thereat. The pin stands 24 join with ribs 44, which are described below.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 has a structure in which an arm portion 25A resiliently deforms as appropriate to allow movement of the leader pin 22 when the leader pin 22 is removed or inserted at the pin stands 24.

A gear aperture 26 is formed at a central portion of the lower case 18. The gear aperture 26 is for exposing an unillustrated reel gear of the reel 14 to the outside. The reel gear meshes with a driving gear of a drive device and drives the reel 14 to rotate inside the case 12. Further, the reel 14 is held by free play-restricting walls 28 so as not to rattle about. The free play-restricting walls 28 are provided projecting at interior surfaces of the upper case 16 and the lower case 18, to serve as interior walls which are disposed along portions of a circular path which is coaxial with the gear aperture 26.

A hollow portion 28A is provided continuously with an end portion of the free play-restricting walls 28 in a vicinity of the opening 20. A hole for regulation of position is formed at an interior portion of the hollow portion 28A. In addition, a hollow portion 28B is standingly provided at a space which is sandwiched between the free play-restricting walls 28 and a front-left corner portion of the case 12. Another hole for regulation of position, which is a long hole, is formed in the hollow portion 28B. The hollow portions 28A and 28B are disposed co-linearly along the direction of arrow B. Except for an end portion at which the hollow portion 28A is continuously provided, each of the free play-restricting walls 28 is provided to be continuous with the peripheral wall 16A or the peripheral wall 18A of the case 12. Thus, an outer side of the free play-restricting walls 28 is set apart from the space for disposing the reel 14.

A memory board M is disposed at a rear-right portion of the lower case 18. The memory board M stores various kinds of information for each individual recording tape cartridge 10. A portion of a rear wall 18C, which structures the peripheral wall 18A, is inclined to the extent of a predetermined angle and the memory board M is disposed to be inclined at the predetermined angle. Hence, the memory board M can be detected at a drive device, which reads the memory board M from a lower face side, and a library apparatus, which reads the memory board M from a rear face side. An unillustrated write-protect portion, which sets whether recording of information to the recording tape cartridge 10 is allowed or disallowed, is provided at a rear-left portion of the lower case 18.

Structure of Opening and of Case at Opening Vicinity

As described above, the opening 20 is formed by cutting away the front-right corner portion. Therefore, an opening face thereof faces in the direction of arrow A and in the direction of arrow B. Consequently, the drawing-out means of the drive device can access and chuck the leader pin 22 from the direction of arrow A, from the direction of arrow B, or from a direction between the directions of arrow A and arrow B. As a result, an area in which the pin stands 24 that hold the leader pin 22 can be disposed is large, and a range from which the drawing-out means of the drive device can chuck the leader pin 22 is wide. Accordingly, a disposition position of the pin stands 24 can be specified to meet specifications of drive devices that carry out chucking from direction A and drive devices that carry out chucking from direction B. Thus, a degree of freedom of design of the drive devices is broadened.

Figure 3:
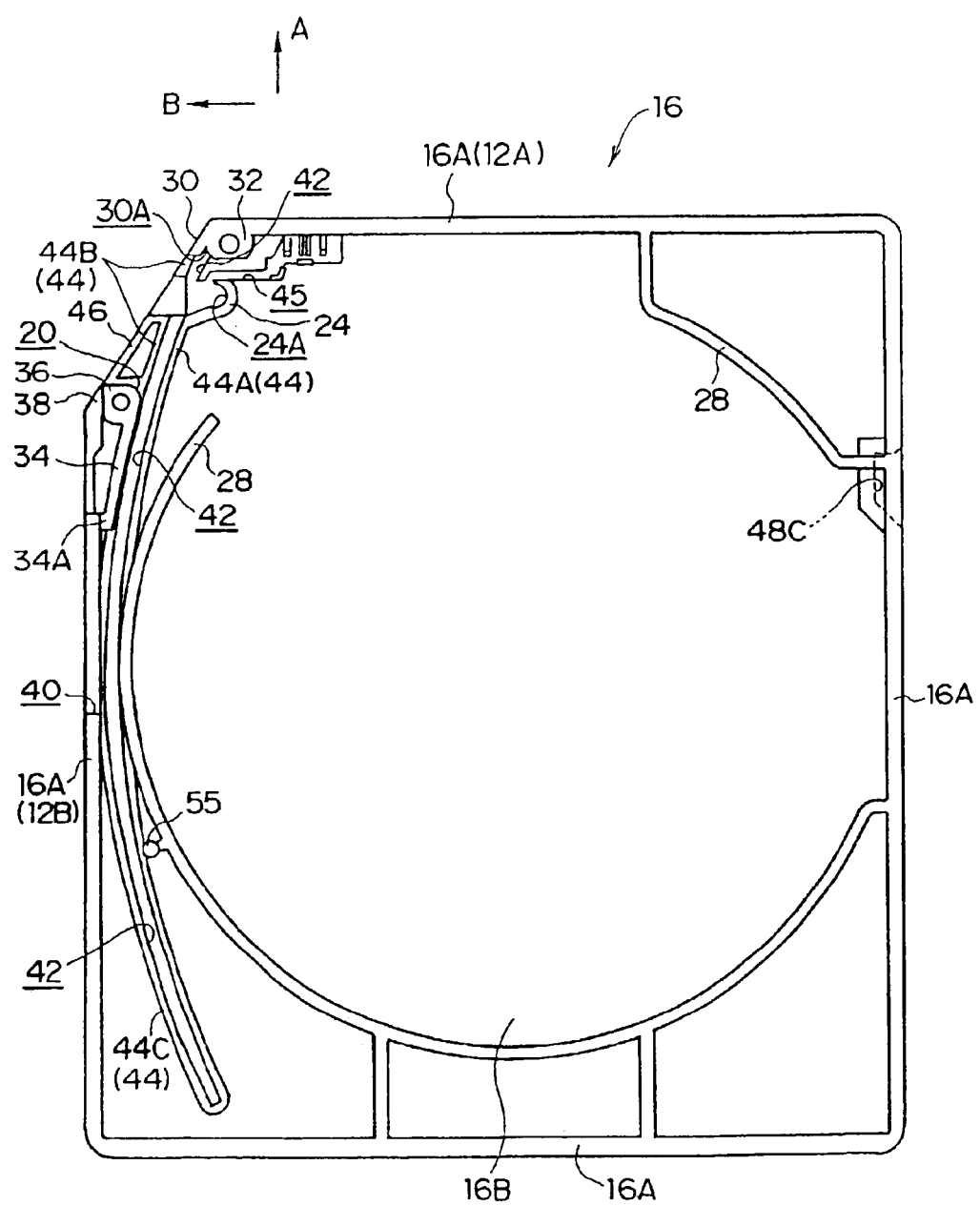
FIG. 3 is a bottom view of an upper case which structures the recording tape cartridge relating to the embodiment of the present invention.
Figure 4:
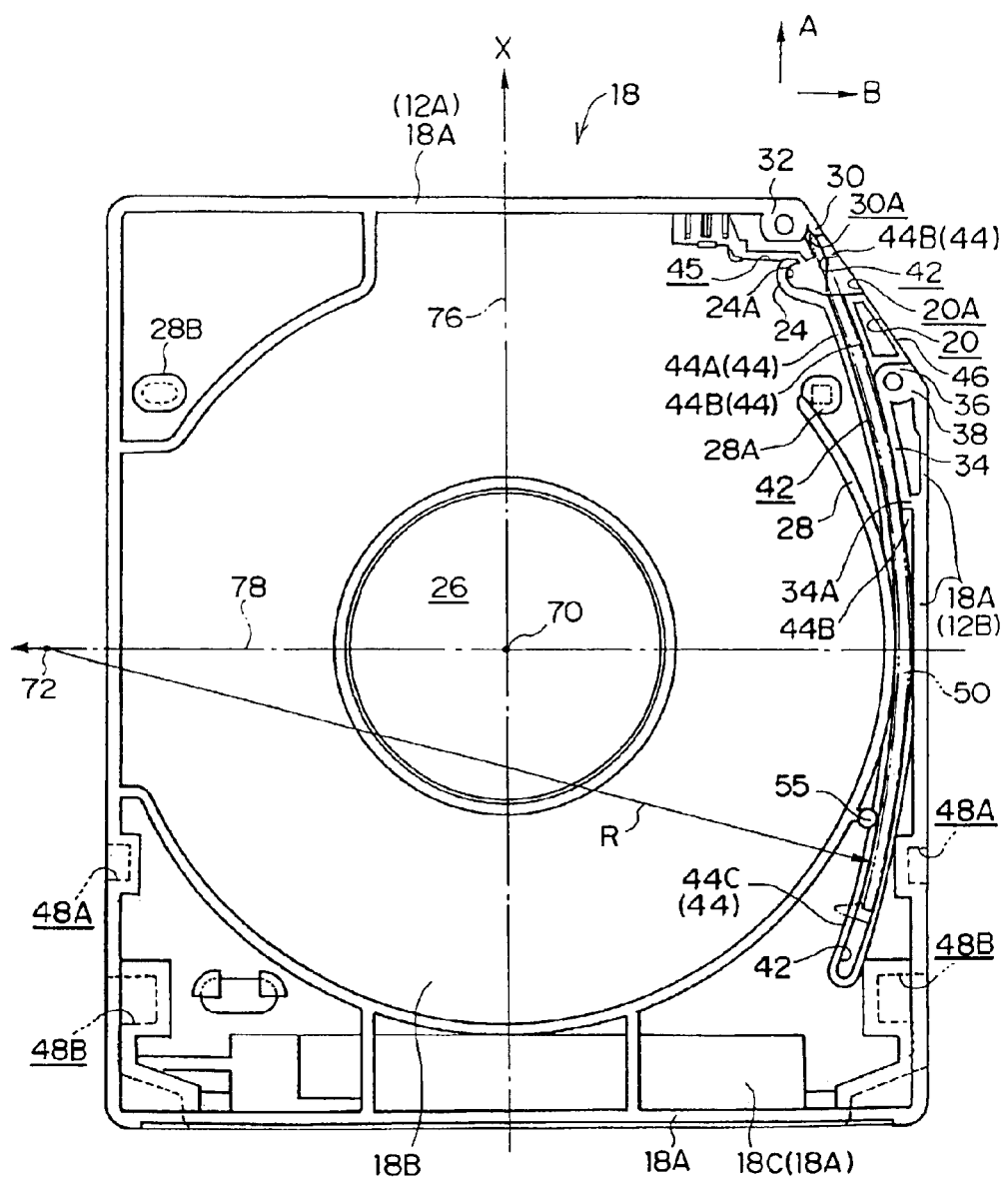
FIG. 4 is a plan view of a lower case which structures the recording tape cartridge relating to the embodiment of the present invention.

As shown in FIG. 3, which is a bottom view of the upper case 16, and FIG. 4, which is a plan view of the lower case 18, respective pairs of upper and lower screw bosses 32 and screw bosses 36 are provided at front and rear edge portions of the opening 20. Together with other screw bosses, which are not shown, the screw bosses 32 and 36 are for screwing to join the upper case 16 and the lower case 18 together.

The pair of screw bosses 32, which is disposed at the front edge portion of the opening 20, is provided continuously with both a front wall 12A of the case 12 (a portion of the peripheral walls 16A and 18A whose outer surface faces in the direction of arrow A) and a pair of short anti-dust walls 30 which is curved along an opening face of the opening 20 from a right end portion of the front wall 12A. A recess portion 30A is formed between the screw bosses 32 and the anti-dust walls 30. A distal end portion of the door 50, which is described later, enters into the recess portion 30A.

At the screw bosses 36, which are disposed at the rear edge portion of the opening 20, a front end portion of a right wall 12B of the case 12 (a portion of the peripheral walls 16A and 18A which runs along the direction of arrow A) is provided continuously with both an inflected wall 38, which is inflected to run substantially along the opening face of the opening 20, and a front end portion of a pair of upper and lower circular arc walls 34, which is provided at an inner side of the right wall 12B. The circular arc walls 34 are formed in circular arc shapes substantially corresponding to an outer peripheral face of the later-described door 50 (and to a movement path of the door 50) in plan view. The circular arc walls 34 respectively protrude to the extent of a predetermined length from the screw bosses 36. A rear end portion of the circular arc walls 34 is provided to be joined with the right wall 12B (the peripheral wall 16A and the peripheral wall 18A) via a short joining wall 34A.

Figure 5:
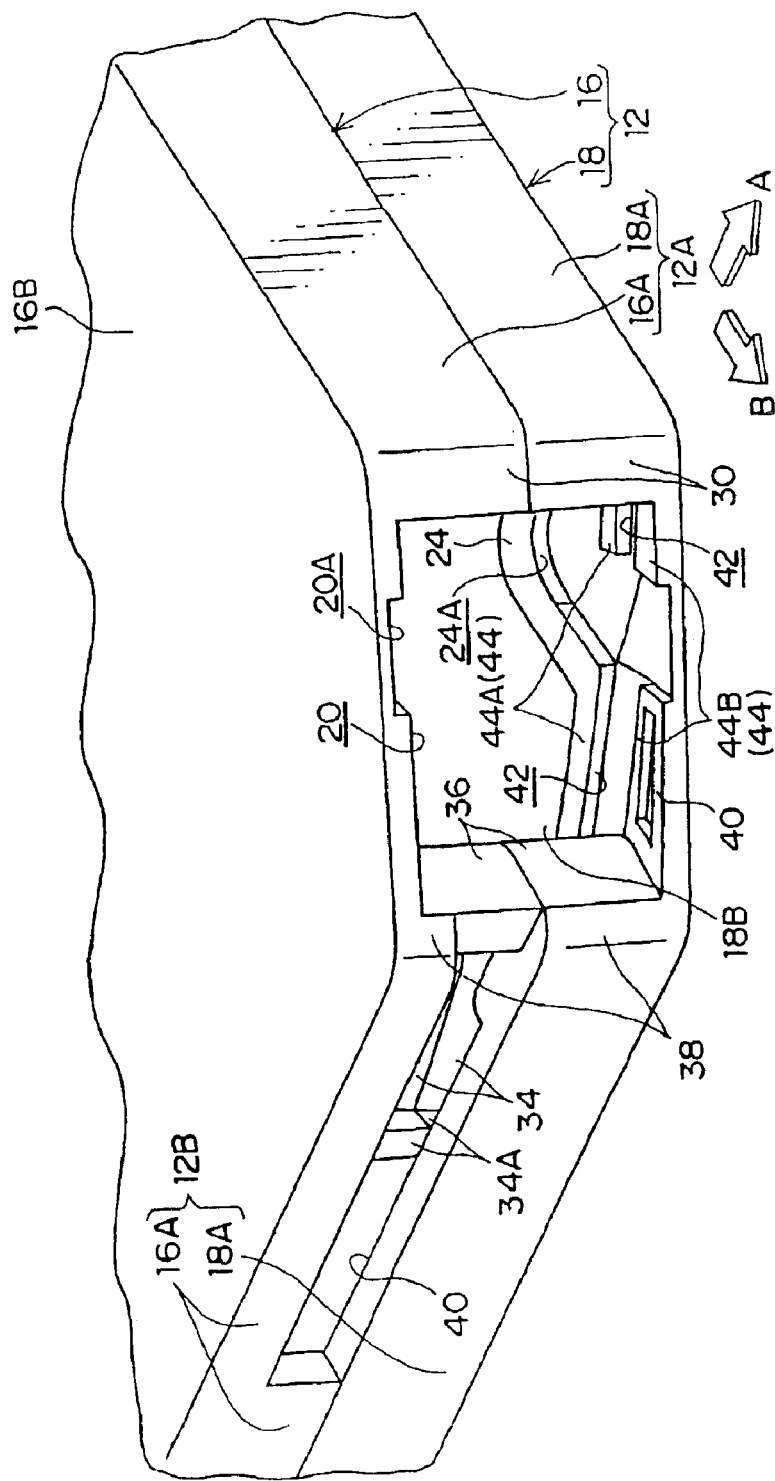
FIG. 5 is a perspective view showing an enlargement of an opening and a slit of the recording tape cartridge relating to the embodiment of the present invention.

As shown in FIG. 5, a slit 40 is provided in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a lower portion of the peripheral wall 16A that structures the right wall 12B. A lower portion of the inflected wall 38 of the upper case 16 is also cut away. Thus, the slit 40 also opens forward. In other words, a lower end portion of the slit 40 is defined by upper end faces of the peripheral wall 18A of the lower case 18 and the inflected wall 38. As a result, the slit 40 is disposed upward of a matching-up portion of the upper case 16 and the lower case 18 (a parting line).

Upper and lower ends of the slit 40 are defined by a portion of the peripheral wall 16A, which functions as a rib, and by the lower case 18. As a result, stiffness of the case 12 is maintained and strength when dropped is preferable. Furthermore, because the slit 40 is provided to be separate from the opening 20, with the screw bosses 36 interposed therebetween, stiffness of a corner portion at the rear edge of the opening 20 is higher and strength when dropped is even more preferable.

Returning to FIGS. 3 and 4, guide grooves 42 for guiding the door 50 are formed in the lower case 18 and upper case 16 structuring the case 12. Groove walls of the guide grooves 42 are structured by the ribs 44, which are provided standing from a ceiling plate 16B of the upper case 16 and a floor plate 18B of the lower case 18, by the right wall 12B (the peripheral wall 16A and the peripheral wall 18A), and by the free play-restricting walls 28. Thus, the guide grooves 42 are formed without reducing thickness of the ceiling plate 16B and the floor plate 18B.

Each of the guide grooves 42 is formed in a circular arc shape along a predetermined circular circumference. The anti-dust walls 30 serve as an end portion of the guide grooves 42 and the guide grooves 42 reach therefrom to a rear-right corner portion of the case 12. The predetermined circular circumference is determined so as to pass (thread) between the right wall 12B and the free play-restricting walls 28 at an outer side of the screw bosses 32 and an inner side of the screw bosses 36. A center point of the predetermined circular circumference (a center of rotation 72 of the later-described door 50) is specified to have a position (coordinate) in a left-right direction which is at an outer side relative to a left end of the case 12 and a position (coordinate) in the front-rear direction which substantially corresponds to a center of rotation of the reel 14 (which is at a center point of the free play-restricting walls 28).

That is, at a portion at which the free play-restricting walls 28 are closest to the right wall 12B, the free play-restricting walls 28 and the right wall 12B structure the groove walls of the guide grooves 42. A rear edge of the slit 40 is located slightly rearward from this portion (by an amount substantially corresponding only to a thickness of the operation projection 52).

Figure 6:
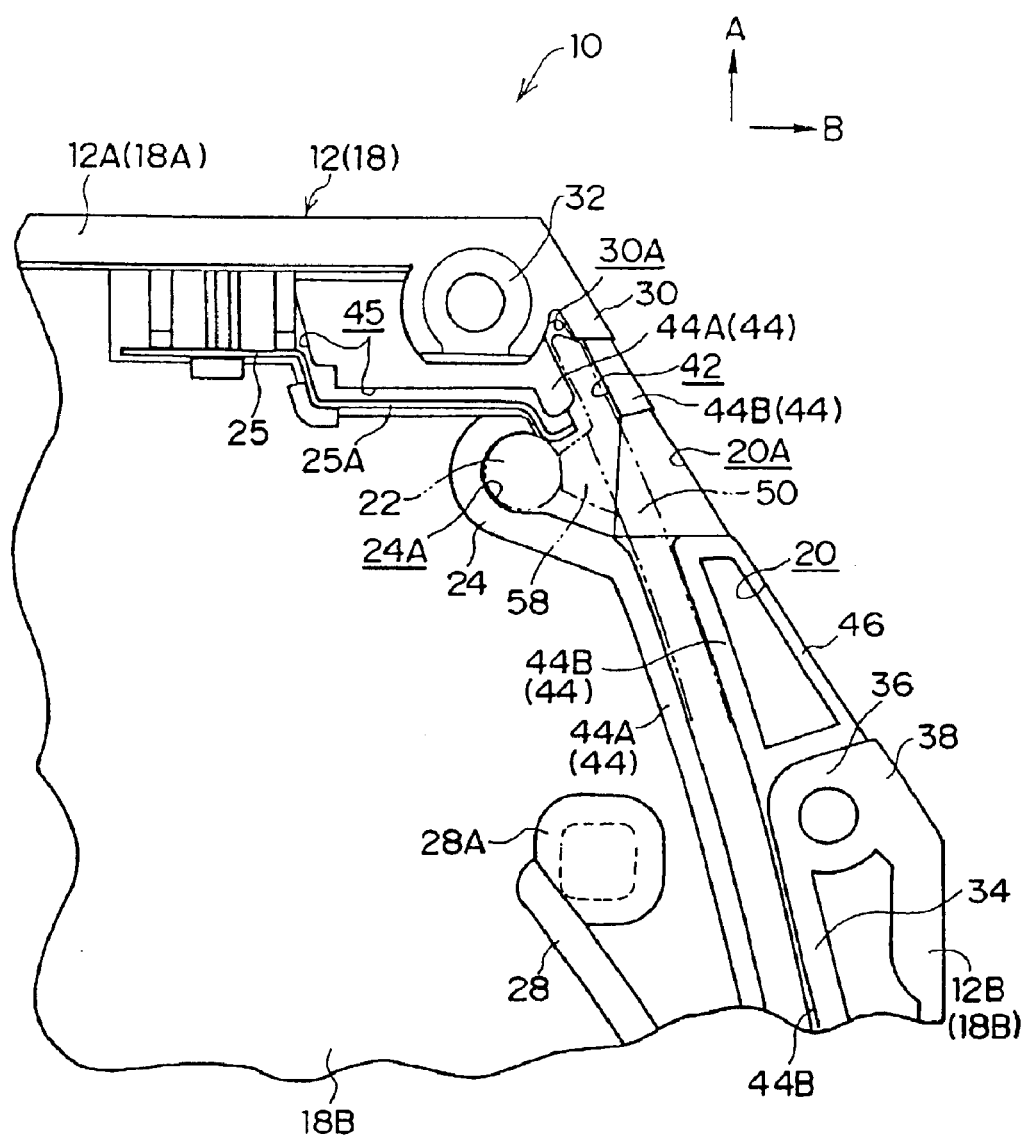
FIG. 6 is a plan view showing an enlargement, at surroundings of the opening, of the lower case which structures the recording tape cartridge relating to the embodiment of the present invention.

As shown in FIG. 6, of the ribs 44, ribs 44A which structure inner sides of front half portions of the guide grooves 42 are cut away rightward of the pin stands 24. Rear edge portions of these cut-away portions are provided continuously with the pin stands 24. Thus, the guide grooves 42 and the pin stands 24 are made to communicate. Front edge portions of the cut-away portions of the ribs 44A are separated from edge portions of the pin stands 24 and structure a portion of a spring groove 45, at which the arm portion 25A of the leaf spring 25 is disposed. Rear edges of the ribs 44A are provided continuously such that outer faces thereof meet with an outer face of the free play-restricting walls 28.

Ribs 44B, which structure outer sides of the front half portions of the guide grooves 42, are cut away rightward of the pin stands 24. A portion at a right side relative to imaginary lines at the ceiling plate 16B and the floor plate 18B, which imaginary lines cross the direction of arrow B and join front edges of the cut-away portions of the ribs 44B with rear edges of the cut-away portions of the ribs 44A, serves as a tapering opening 20A, which guides the leader pin 22 into the case 12. Ribs 46, which are formed along each of a rear edge of the tapering opening 20A, the front end of the screw bosses 36, and the opening face of the opening 20 are provided continuously with the ribs 44B. Thus, strength of surroundings of the opening 20 is preserved or improved. An intermediate portion of the ribs 44B passes slightly inward relative to an inner face of the circular arc walls 34, and a rear end portion of the ribs 44B is provided continuously such that inner sides thereof meet with the inner side of the right wall 12B rearward of the short joining wall 34A.

Rear ends of ribs 44C, which structure rear half portions of the guide grooves 42, curve back on themselves in substantial U shapes. Front ends of the ribs 44C are continuously provided such that inner side portion front ends of the ribs 44C meet with the outer side of the free play-restricting walls 28 and outer side portion front ends of the ribs 44C meet with the inner side of the right wall 12B. The rib 44C of the upper case 16 is formed to be longer than the rib 44C of the lower case 18 (i.e., the rear end closing off the substantial U shape is positioned further rearward for the former than the latter). The purpose of this is to prevent interference between the door 50 and the right wall 12B side of the memory board M or the rear wall 18C (the peripheral wall 18A) of the lower case 18 forming the inclined surface at which the memory board M is disposed. Rear end portions of the guide grooves 42 are respectively closed off by the substantial U shapes formed by the ribs 44C, and protrusion portions 51 (described later), which are located above and below at a rearmost side of the door 50, are made to be engageable with the ribs 44C so as to restrict movement of the door 50 further rearward therefrom.

The ribs 44A and 44B, which are substantially the front half portions of the ribs 44 structuring the guide grooves 42, are formed to project less than the ribs 44C, which are substantially the rear half portions of the ribs 44. For example, the ribs 44A and ribs 44B may have heights from the ceiling plate 16B and floor plate 18B of 1 mm, with the corresponding heights of the ribs 44C being 1.5 mm. The purpose of this is to assure space in the vertical direction for the drawing-out means of the drive device, which chucks and draws out the leader pin 22, to enter into the opening 20. Accordingly, as described later, a plate breadth (height) at a front half portion of the door 50 (at least a portion which closes off the opening 20) is formed to be greater (higher). In addition, heights of the pin stands 24 and the ribs 46 are respectively set to be equivalent to the heights of the ribs 44A and 44B.

A pair of upper and lower spring-engaging pins 55 are provided at a length direction central portion of the inner side portion of the ribs 44C. Each spring-engaging pin 55 is provided continuously with the free play-restricting walls 28. Of the spring-engaging pins 55, the lower case 18 side spring-engaging pin 55 is formed to be longer, and a portion thereof which protrudes further up than the corresponding free play-restricting wall 28 is a structure at which a one end side annular portion 56A of a coil spring 56, which is described later, hooks on. Hence, the upper case 16 side spring-engaging pin 55, which is shorter, matches up with the lower case 18 side spring-engaging pin 55, and disengagement of the coil spring 56 is prevented.

Respective pairs of right and left recess portions 48A and 48B are formed in the case 12 at positions rearward relative to the rear edge of the slit 40. The recess portions 48A are, for example, engaging portions at which pulling-in means of a drive device engages, with floor faces (faces facing downward) of the recess portions 48A being reference surfaces for positioning in the drive device. The recess portions 48B are engaging portions for clasping means of a library apparatus. A cell retention notch 48C, which serves as a recess portion which opens upward and leftward, is formed at a left side portion of the case 12. By engaging with an engaging protrusion 60 of the drive device, the cell retention notch 48C cancels out a torque when the opening 20 is opened or closed (a moment of rotation in accordance with operation of the operation projection 52 which is exposed through the slit 40).

In a state in which the peripheral walls 16A and 18A of the upper case 16 and lower case 18 described above are matched together, unillustrated screws are screwed into the screw bosses 32, the screw bosses 36 and other screw bosses from the lower side, and the screw bosses are fixed (joined) to structure the case 12. Major diameters of the screws may be, for example, 2.0 mm, with the outer diameters of the screw bosses 32 and screw bosses 36 being 4.0 mm. Accordingly, corner portions at the two edges of the opening 20, which are at locations of the case 12 which are usually disadvantageous for strength and which tend to be severely impacted on a floor surface or the like when dropped, are securely fixed. Thus, even if the case 12 is dropped, this structure will not be deformed or buckled by the overall weight of the recording tape cartridge 10, so as to cause mispositioning.

At areas at which the pin stands 24 are disposed (near the opening 20), plate thicknesses of the upper case 16 and lower case 18 are both set to 2.4 mm, which is thicker than at other areas (2 mm on average). Furthermore, the case 12 (the upper case 16 and the lower case 18) is formed of a polycarbonate material (PC) whose mechanical strength is high. The case 12 may be formed of acrilonitrile butadiate styrene (ABS), a metallic material or the like instead of PC.

The purpose of this is to raise the strength of the vicinity of the pin stands 24, which is the location at which the leader pin 22 is held (positioned). Consequently, mispositioning of the leader pin 22, which is the most important component for functioning of the recording tape cartridge 10 (and which must be accurately engaged by the drawing-out means when the recording tape is to be drawn out), subsequent to an impact due to dropping of the case 12 (the recording tape cartridge 10) or the like does not occur.

The position at which the pin stands 24 are disposed is determined such that an axial center of the leader pin 22 held thereat is positioned at an inward side of an imaginary line (not illustrated) which joins axial centers of the screw bosses 32 and the screw bosses 36, which are located at the front and rear edge portions of the opening 20. In the present embodiment, the pin stands 24 are disposed at a position closer to the screw bosses 32 than to the screw bosses 36. With this structure, mispositioning of the leader pin 22 due to vibrations of the ceiling plate 16B and floor plate 18B that accompany dropping of the case 12 or the like can be prevented.

In this case 12, the peripheral wall 16A of the upper case 16 and the peripheral wall 18A of the lower case 18 are set to have equal heights. Thus, machining accuracies of portions thereof that match up with one another (accuracies of resin-forming in molds) are at about the same level. Thus, assembly characteristics and dropping impact resistance are made favorable. Furthermore, bending strength of the case 12 is improved by formation of the recess portions 48A, the recess portions 48B and the cell retention notch 48C, and other recess portions and the like which are formed as necessary.

A diagonal angle of the opening face of the opening 20 with respect to the direction of arrow A (a diagonal angle of the ceiling plate and floor plate of the case 12 that define the top and bottom of the opening 20) is determined in accordance with requirements for distinguishing (identifying) the recording tape cartridge 10 at a library apparatus. That is, the library apparatus accommodates a plurality of the recording tape cartridge 10 and automatically (i.e., without human intermediation) mounts and removes the recording tape cartridge 10 at the drive device. In a case in which there is a plurality of types of the recording tape cartridge 10 to be handled and a plurality of types of drive device, it is necessary to identify a generation, recording capacity or the like of the recording tape cartridge 10. The diagonal angle of the opening face of the opening 20 may be utilized for this identification.

Accordingly, the opening 20 for drawing out of the magnetic tape T, which has been implemented in consideration of strength as described above, can also function as an identification portion in a library apparatus, based on the diagonal angle of the opening face of the opening 20 (to be specific, the diagonal angle of the ceiling plate and floor plate that define the top and bottom of the opening 20). Therefore, insufficient strength of the case 12, deterioration of dust-proofing and complicated mold construction, which are concerns in a situation in which the opening 20 and the identification portion are provided separately (for example, a case in which one or a plurality of through-holes formed in the case 12 serve as an identification portion), can be prevented.

Structure of Door

The opening 20 described above is opened and closed by the door 50, which serves as a covering member. As shown in FIG. 7A, the door 50 is curved in a plate thickness direction thereof and is formed in a circular arc form whose curvature substantially coincides with curvature of the guide grooves 42 (the predetermined circular circumference) in plan view. The plate breadth (height) of the door 50, as shown in FIG. 7B, is set to be substantially the same as the opening height of the opening 20. Plate breadth of the door 50 is made slightly smaller at a portion rearward relative to a closing portion 50A, which serves as a driven portion 50B.

Figure 9A:
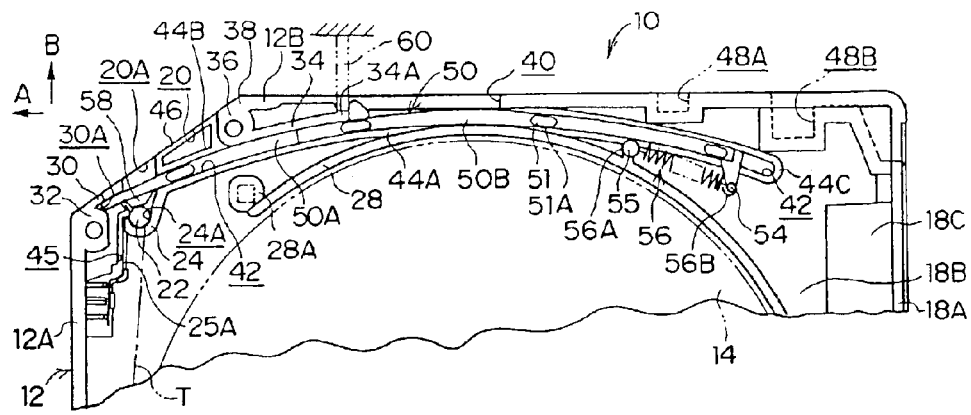
FIG. 9A is a plan view showing an opening process of the opening of the recording tape cartridge relating to the embodiment of the present invention, viewed with the upper case removed, which shows an initial state of engagement of an engaging protrusion of a drive device with an operation projection of the door.

The plate length of the door 50 (the curved length dimension) is determined such that, in a state in which the opening 20 is closed, a rear end portion of the driven portion 50B is disposed inside the rear-right corner portion of the case 12 (see FIG. 9A). A lower-rear portion of the driven portion 50B is cut away at an angle in order to avoid the memory board M which is inclinedly disposed at the rear wall 18C.

Thus, the door 50 is a structure which closes the opening 20 (see FIG. 9A) in a state in which a distal end portion of the closing portion 50A enters into the recess portion 30A located at the outer side of the screw bosses 32 and a rear portion of the closing portion 50A substantially contacts an inner side of the screw bosses 36 (the circular arc walls 34). The door 50 moves (rotates) substantially rearward along the guide grooves 42 to open the opening 20 (see FIG. 9B). When an outer peripheral face of a distal end vicinity of the closing portion 50A reaches the inner side of the screw bosses 36, the opening 20 is completely opened (see FIG. 9C). When the opening 20 is open, the door 50 can close the opening 20 by rotating substantially in the opposite direction.

Thus, the door 50 is formed to be curved so as to open and close the opening 20 by rotating along the movement path (the guide grooves 42) without deviating from the predetermined circular circumference.

A plurality of the protrusion portions 51 are protrudingly provided at upper and lower ends of the door 50 and enter into the upper and lower guide grooves 42, respectively. The protrusion portions 51 have different protrusion heights from the closing portion 50A and the driven portion 50B, but distances from a breadth direction centre line of the door 50 (along the length direction thereof) to peak portions of the protrusion portions 51 are constant. Thus, the upper and lower protrusion portions 51 slide against the ceiling plate 16B and floor plate 18B, which are floor portions of the guide grooves 42.

Protrusions 51A are protrudingly provided at the protrusion portions 51, at both sides in the plate thickness direction of the door 50. Peak portions of the protrusion portions 51 are in line with plate thickness direction faces of the door 50. The protrusion portions 51 slide against the groove walls of the guide grooves 42 (the ribs 44 and the like). The protrusion portions 51 that are located furthest toward the front are disposed so as to enter into the tapering opening 20A, which communicates with the guide grooves 42, during the opening/closing process of the opening 20. The upper and lower protrusion portions 51 that are located furthest toward the rear engage at the rear end turning-back portions of the ribs 44C and prevent rotation of the door 50 therebeyond in the state in which the opening 20 is opened. In this state, a rear end portion of the door 50 (a later-described spring-engaging portion 54 and the like) is disposed so as not to interfere with the case interior or the memory board.

Because of the protrusion portions 51 and the protrusions 51A, the door 50 is a structure which is guided at the guide grooves 42 when opening/closing the opening 20, and is reliably threaded between the right wall 12B and the free play-restricting walls 28, at the outer side of the screw bosses 32 and the inner side of the screw bosses 36, without deviating from the movement path.

At an outer peripheral surface of the door 50, at a front end vicinity of the driven portion 50B (the closing portion 50A side thereof), the operation projection 52 projects along a diametric direction of the door 50, to serve as an operation portion. The operation projection 52 is exposed to the outside of the case 12 through the slit 40. When the opening 20 is in the closed state, the operation projection 52 is positioned to be slightly separated from the joining wall 34A of the upper case 16, and is operable through the portion of the slit 40 that opens frontward at the cut-away portion of the inflected wall 38. Dimensions of each portion are determined such that a distal end portion of the operation projection 52 does not protrude further than the outer surface of the right wall 12B (an exterior profile of the case 12) in this state (see FIG. 9A), and the joining wall 34A is inclined so as to substantially coincide with a length direction of the operation projection 52.

When the opening 20 is in the opened state, the operation projection 52 is positioned to be slightly separated from the rear edge of the slit 40. The dimensions of each portion are determined such that the length direction of the operation projection 52 is substantially perpendicular to the right wall 12B of the case 12 (the direction of arrow A) in this state.

Thus, although this operation projection 52 communicates between the interior and exterior of the case 12 via the exposing slit 40, the door 50, which spans substantially the whole height of the interior of the case 12, is in extremely close contact with the circular arc walls 34 along a predetermined length at a front side of the slit 40, and the door 50 and the right wall 12B are in close contact at a rear side of the slit 40. Thus, the slit 40 is always substantially closed. Accordingly, adherence of dust and the like to the magnetic tape T wound onto the reel 14 is prevented.

Figure 8:
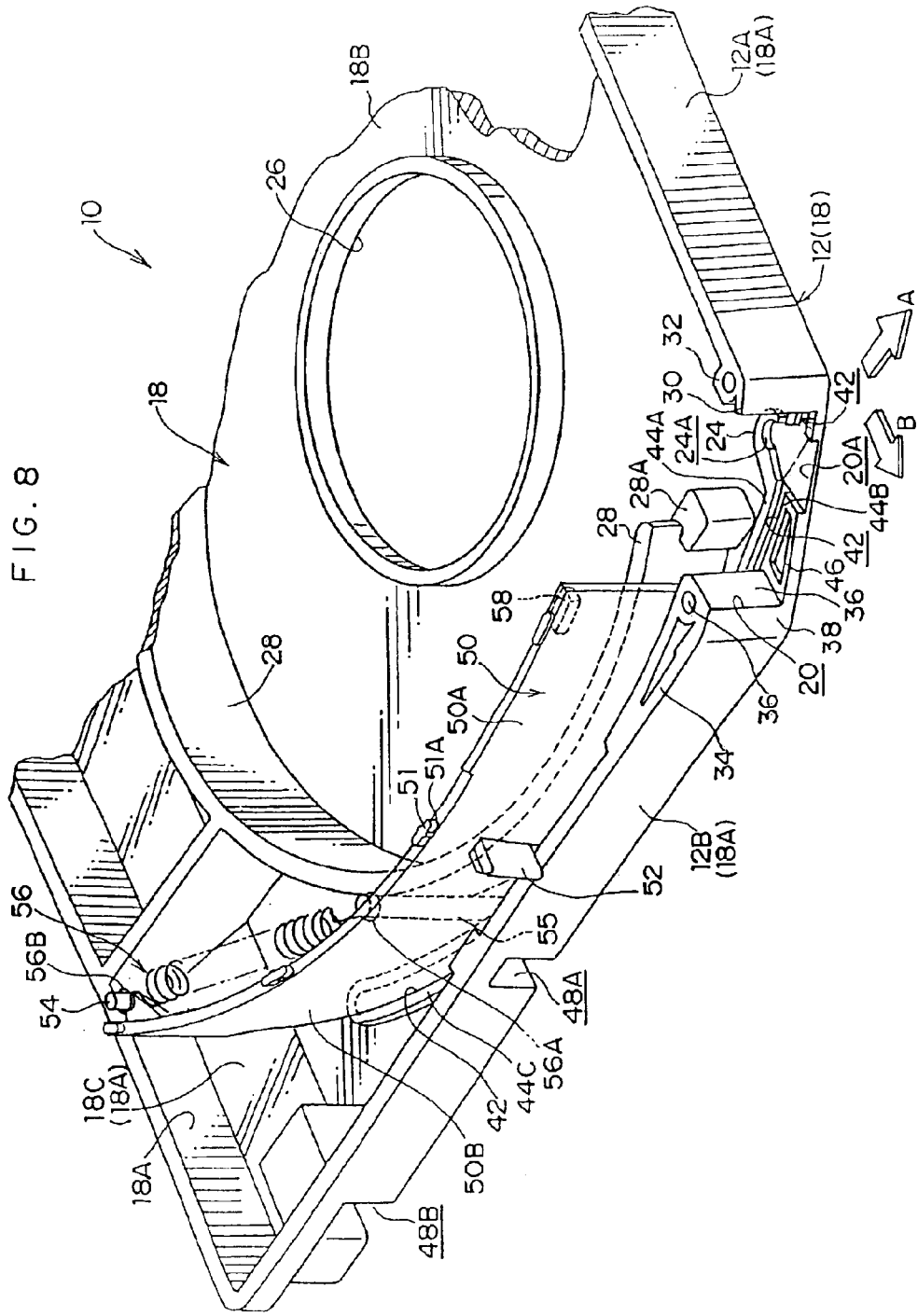
FIG. 8 is a perspective view, viewed with the upper case removed, showing a state in which the opening which structures the recording tape cartridge relating to the embodiment of the present invention is open.

The spring-holding portion 54, which has the form of a substantial L-shape toward an inner face side of the door 50, is protrudingly provided at a rear end portion of the driven portion 50B of the door 50. The spring-engaging portion 54 has a free end at an upper end side thereof. The coil spring 56, which serves as an urging means, is engaged and retained at the spring-engaging portion 54. Specifically, the annular portion 56A and an annular portion 56B are provided at end portions of the coil spring 56 for engagement. The annular portion 56A is passed through by the spring-engaging pins 55 of the case 12 and is engaged and retained at the case 12, and the annular portion 56B is passed through by the spring-engaging portion 54 and is engaged and retained at the door 50 (see FIG. 8).

Accordingly, in this structure, the door 50 is urged in a direction to close the opening 20 by urging force of the coil spring 56, and the door 50 continuously closes the opening 20. The coil spring 56 has a length that reaches as far as the rear-right corner portion of the case 12 in the state in which the door 50 closes the opening 20 as described above. Thus, the coil spring 56 is disposed so as to effectively use a space between the free play-restricting walls 28 and the peripheral walls 16A and 18A (and the rear wall 18C) at the rear-right corner portion.

Stoppers 58, which abut against an upper end portion side face and a lower end portion side face of the leader pin 22 when the opening 20 is closed, are protrudingly provided at the inner face of the closing portion 50A of the door 50. Consequently, detachment of the leader pin 22 from the pin stands 24 by dropping impacts and the like can be reliably prevented. Further, at the distal end of the closing portion 50A of the door 50, the inner face and/or the outer face preferably has a tapered form so as to enter into the recess portion 30A smoothly. In the present embodiment, tapering faces are formed at both the inner and outer faces of the door 50.

The door 50 described hereabove is formed of, for example, a polyoxymethylene (POM) resin, which has a low coefficient of friction and has excellent abrasion resistance with respect to the case 12 constituted of PC. The operation protection 52, the spring-holding portion 54 and the like may be structured as separate bodies (of different materials). The protrusion portions 51 and the protrusions 51A may be formed integrally with the door 50 which is constituted of POM, and may be formed separately from a main body of the door 50 (the closing portion 50A and the driven portion 50B). In the case of separate bodies, the protrusion portions 51 and protrusions 51A may be structured of a resin such as polyamide (PA), polytetrafluoroethylene (PTFE), polyethylene (PE) or the like, a metallic material, or a material including one or more of these as a principal component. However, in a situation in which the case 12 is structured of a metallic material, it is required that the protrusion portions 51 and protrusions 51A be structured of a resin material, in consideration of abrasion characteristics, prevention of noise, and the like.

Next, operation of the present embodiment will be described.

In the recording tape cartridge 10 having the structure described above, the opening 20 is closed by the door 50 when the recording tape cartridge 10 is not in use (during storage, during transportation, and the like). Specifically, a distal end portion (front end portion) of the closing portion 50A of the door 50 is entered into the recess portion 30A between the anti-dust walls 30 and the (outer side of) the screw bosses 32 by the urging force of the coil spring 56. At the same time, a rear end portion vicinity of the closing portion 50A substantially abuts against an inner face of an outer peripheral surface of the screw bosses 36 (an inner face of the circular arc walls 34) to close off the opening 20.

In contrast, when the magnetic tape T is to be used, the recording tape cartridge 10 is loaded into a drive device along the direction of arrow A. In accordance with this loading, as shown in FIG. 9A, an engaging protrusion 60, which structures opening means of the drive device, advances into the slit 40 which opens frontward at the cut-away portion of the inflected wall 38, and engages with the operation projection 52 of the door 50.

Figure 9B:
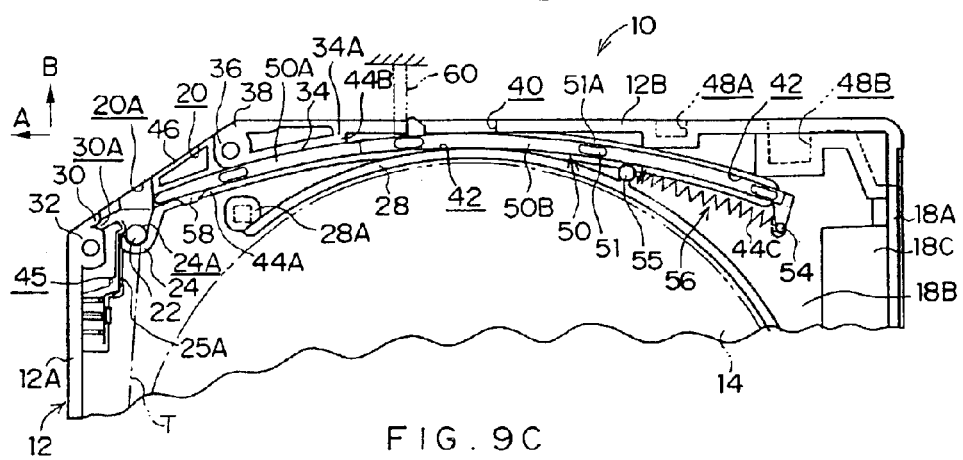
FIG. 9B is a plan view showing the same opening process, which shows a state during opening of the opening.

As the recording tape cartridge 10 (the case 12) is pushed in further, as shown in FIG. 9B, the urging force of the coil spring 56 is opposed by a force of pushing in, and the engaging protrusion 60 moves the operation projection 52 rearward (that is, relatively rearward with respect to the case 12 which is being loaded in the direction of arrow A).

Thus, the protrusion portions 51 and protrusions 51A of the door 50 from which the operation projection 52 protrudes are guided by the pair of upper and lower guide grooves 42, and the door 50 rotates clockwise, in plan view, along the direction of curvature thereof. That is, the door 50 moves substantially rearward so as to swing at the outer side of the reel 14 and the pin stands 24 without significantly deviating from the movement path along the shape of the curvature, and the door 50 opens the opening 20.

Here, the door 50 is formed in the shape of the curvature in plan view and rotates around the center of rotation 72. If an axis which is parallel to the direction of loading into the drive device (direction A) and includes an axis of rotation 70 of the reel 14 is taken to be an X axis 76, the center of rotation 72 is specified so as to be located on a Y axis 78, which is an axis intersecting the X axis 76 and including the axis of rotation 70 of the reel 14. Accordingly, because a position at which the reel 14 and door 50 are closest is a position on the Y axis 78, even if a spacing between the reel 14 and the door 50 at that position is made smaller, the reel 14 will not abut against the door 50 when the door 50 is rotated, and a degree of curvature of the door 50 can be moderated (that is, a radius R of the curvature of the door 50 can be made larger). Consequently, sliding resistance between the door 50 and the case 12 is reduced.

As long as the above condition is satisfied, the center of rotation 72 and the above-mentioned radius of curvature R (the shape of the guide grooves 42) can be suitably determined in accordance with positions of the front and rear edge portions of the opening 20 (the screw bosses 32 and 36), which are determined by requirements of the drive device, and the angle of the angled opening face of the opening 20 and the like, which is determined by requirements of the library apparatus.

Figure 9C:
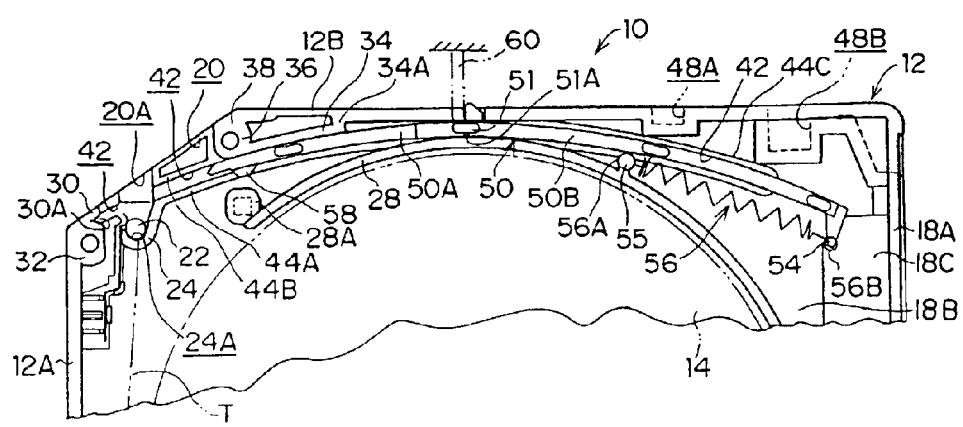
FIG. 9C is a plan view showing the same opening process, which shows a state of complete opening of the opening.
Figure 10:
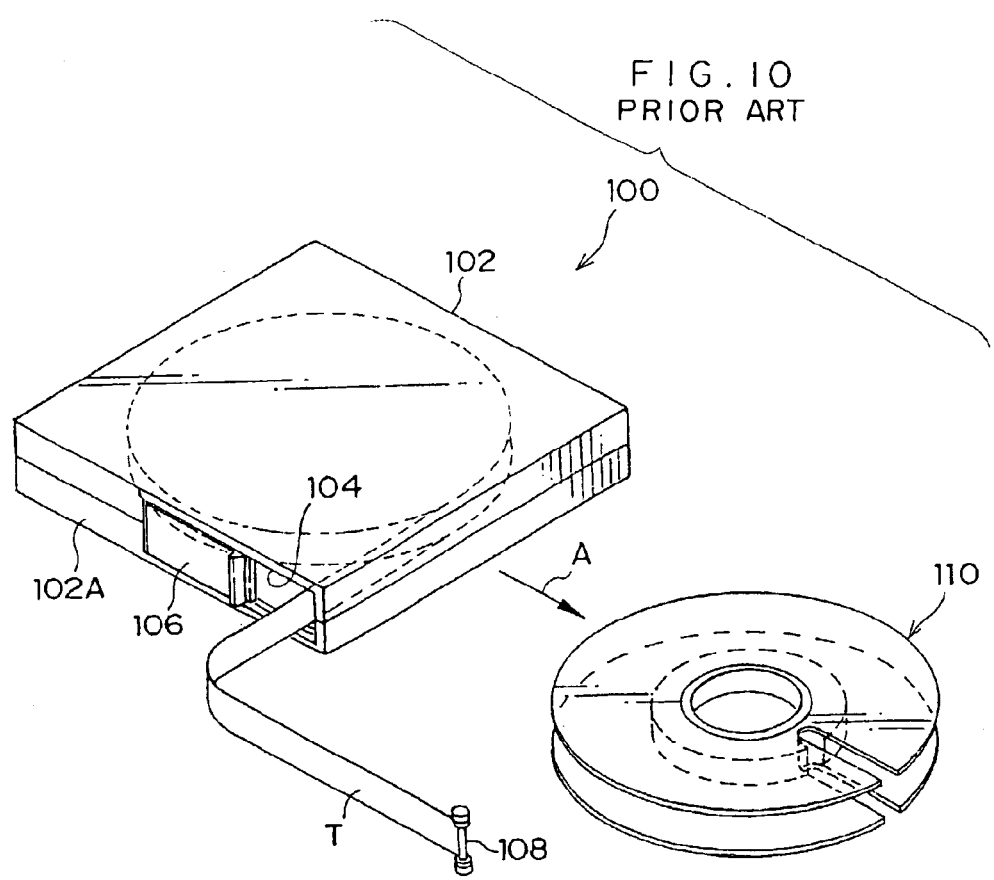
FIG. 10 is a perspective view showing overall structure of a conventional recording tape cartridge.
Figure 11:
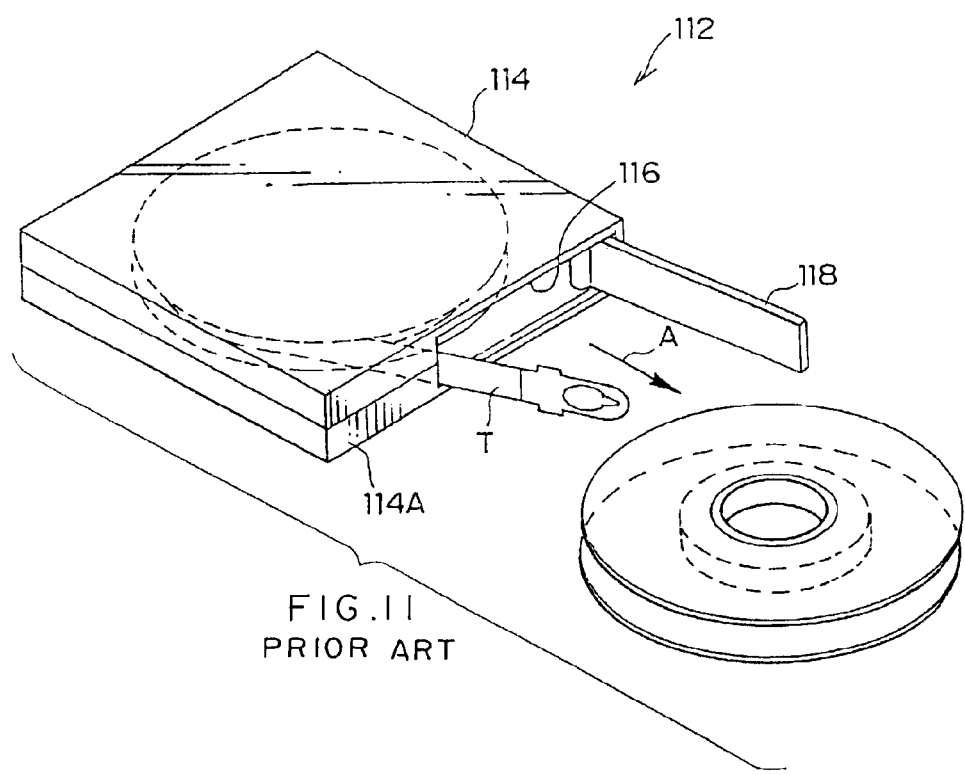
FIG. 11 is a perspective view showing overall structure of another conventional recording tape cartridge.
Figure 12:
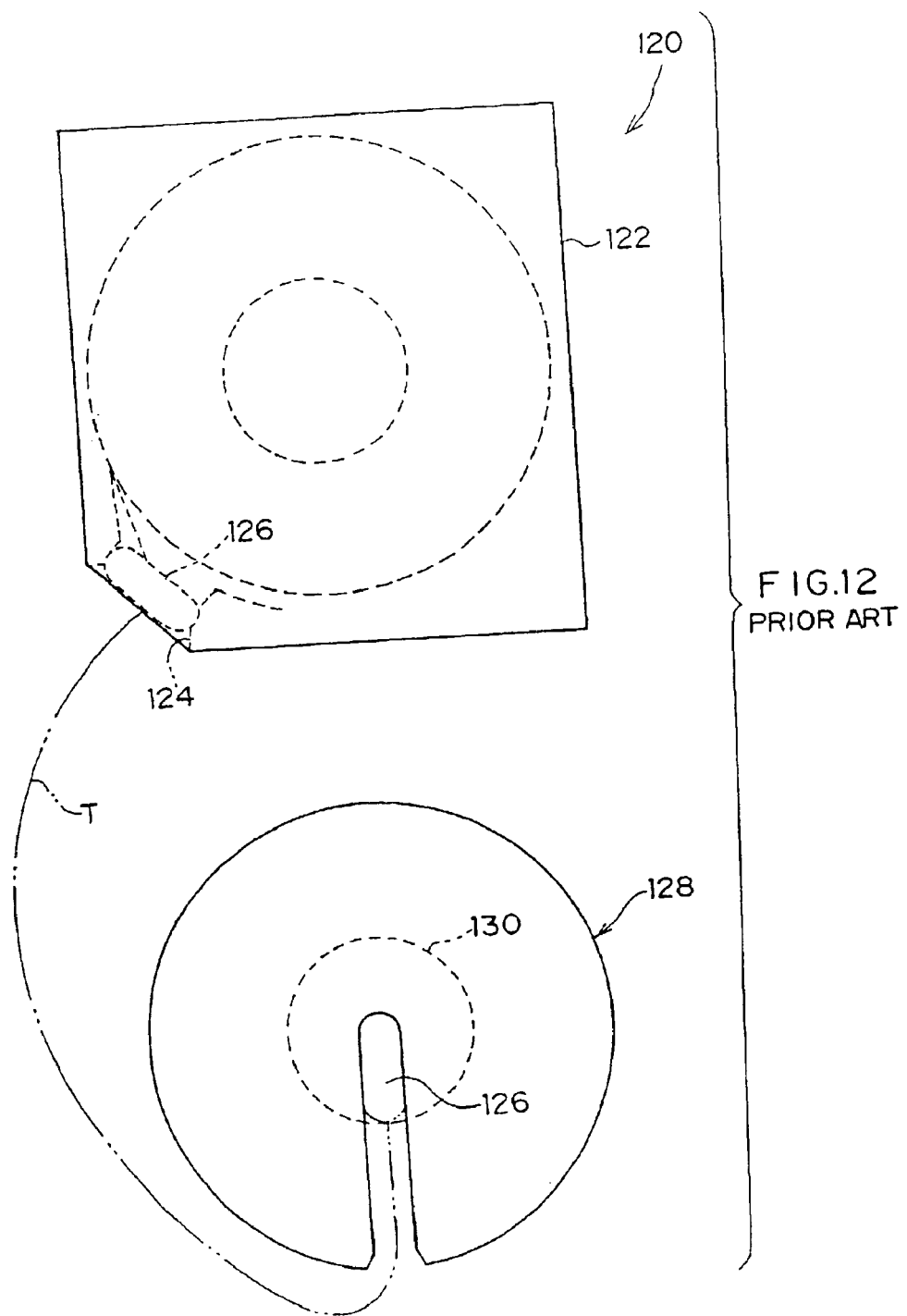
FIG. 12 is a perspective view showing overall structure of yet another conventional recording tape cartridge.

When the case 12 (the recording tape cartridge 10) is loaded to a predetermined depth in the drive device, the opening 20 is completely open, as shown in FIG. 9C. In this state, because the operation projection 52 of the door 50 abuts against the closed rear end portion of the slit 40, rotation (substantially rearward movement) of the door 50 therebeyond is restricted.

In this state, when the recording tape cartridge 10 has been positioned within the drive device, the drawing-out means of the drive device advances into the case 12 through the opened opening 20, and the drawing-out means takes out the leader pin 22, which has been positioned and retained at the pin stands 24, and accommodates the leader pin 22 at the winding reel. Then, the winding reel and the reel 14 are driven to rotate at the same time, and the magnetic tape T is wound around the winding reel while being sequentially drawn out from the case 12. Information recording/replaying is carried out on the magnetic tape T by a recording/replaying head or the like which is disposed along a predetermined tape path.

Subsequently, when the magnetic tape T has been wound back to the reel 14 again and the recording tape cartridge 10 is to be ejected from the drive device, the state of positioning of the recording tape cartridge 10 is released and the recording tape cartridge 10 is moved in the direction opposite to the direction of arrow A by the urging force of the coil spring 56 and/or by an unillustrated ejection mechanism.

Thus, the door 50 is guided at the guide grooves, in the same manner as when the opening 20 is opened, while being rotated in the closing direction of the opening 20 by the urging force of the coil spring 56. The distal end portion of the closing portion 50A of the door 50 enters into the recess portion 30A, and the door 50 returns to the initial state in which the opening 20 is completely closed.

Here, because the opening 20 is formed by cutting away the loading side corner portion of the rectangular case 12, the opening face of the opening 20 faces in the direction of arrow A and in the direction of arrow B (the opening face is diagonal with respect to the direction of arrow A). This means that the drawing-out means of the drive device can gain access to the leader pin 22 from a front face side which faces the case 12 in the direction of arrow A, and it is not required that the drawing-out means gains access from an outer side relative to the peripheral walls (side walls) 16A and 18A (i.e., from an arrow B side). Consequently, in this drive device, a path for drawing out the magnetic tape T can be made as short as possible, and the drawing-out means does not require a drive mechanism for turning the magnetic tape T around from the arrow B side of the case 12. Thus, reductions in size and costs can be expected.

Moreover, because the screw bosses 32 and 36 are located at the two edge portions of the opening 20, dropping strength of the case 12 at surroundings of the opening 20 is excellent, and the door 50 disposed at the inner side of the screw bosses 36 reinforces dropping strength of the screw bosses 36.

Further, the door 50, which is curvedly formed in the circular arc shape, is rotated to open and close the opening 20 by swinging around an outer side of the reel 14 and the pin stands 24 (and the leader pin 22) without deviating from the movement path along the shape of the curvature. Therefore, the door 50 will not protrude beyond an external profile region of the case 12 during opening and closing of the opening 20. As a result, a space for accommodation of the recording tape cartridge 10 in the drive device is smaller, and the movement path of the door 50 does not interfere with the pin stands 24 (the leader pin 22), the reel 14 and the like in the case 12.

Accordingly, with the recording tape cartridge 10 relating to the present embodiment, the door 50 is curvedly formed so as to open and close the opening 20 by rotating without deviating from the predetermined circular circumference which is the movement path thereof, and the center of rotation 72 of the door 50 is specified so as to be positioned on the Y axis 78 which includes the axis of rotation 70 of the reel 14. Hence, the position at which the reel 14 and the door 50 are closest together is positioned on the Y axis 78, and even if a gap between the reel 14 and the door 50 at this position is narrow, the degree of curvature of the door 50 can be moderated (that is, the radius R of the circular arc of the door 50 can be made larger). Consequently, sliding resistance which is caused by the door 50 and the case 12 can be reduced without hindering size reduction of the recording tape cartridge 10. (In contrast, in a case in which the center of rotation 72 of the door 50 is not positioned on the Y axis 78, or on the X axis 76 or the like, increases in the radius R of the circular arc of the door 50 are subject to greater constraint than in the case described above, and sliding resistance that is caused by the door 50 and the case 12 cannot be greatly reduced.)

Now, the recording tape cartridge relating to the present invention is not limited to the recording tape cartridge 10 relating to the embodiment described above, and can be suitably altered and implemented within a range that does not change the essence thereof. Thus, for example, the door 50 may be a structure which rotates at an inner side of the front wall 12A for opening and closing the opening 20. In such a case, the center of rotation 72 is positioned on the X axis 76. Furthermore, a structure in which a magnetic tape T is employed as the recording tape is used in the embodiment described above. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As is explained above, according to the present invention, a recording tape cartridge which reduces contact resistance that is generated between a door and inner walls of a case when the door is moved for opening/closing an opening of the case is realized.

What is claimed is:

1. A tape cartridge which is insertable at a tape drive, the tape drive being provided with an opening member which is operably engageable with the tape cartridge at a time of insertion of the tape cartridge and carrying out at least one of reading and writing of data, the tape cartridge comprising:
   a case;
   a single reel rotatably provided in the case, the reel including a first center of rotation thereof;
   a tape unwindably attached to the reel;
   a tape access opening provided at the case; and
   a covering member which is reciprocally moveable along a circular arc-form movement path between a closed position for closing the tape access opening and an open position for opening the tape access opening, the circular arc including a predetermined radius thereof from a second center of rotation,
   wherein a position of the first center of rotation in a direction of the insertion of the cartridge substantially coincides with a position of the second center of rotation in the cartridge insertion direction.

2. The tape cartridge of claim 1, wherein a point of the circular arc-form movement path that is closest to the reel comprises a position in the cartridge insertion direction which substantially coincides with the positions in the cartridge insertion direction of the centers of rotation.

3. The tape cartridge of claim 1, wherein the case appears substantially rectangular in plan view.

4. The tape cartridge of claim 1, wherein the case comprises a front wall portion facing in the cartridge insertion direction, a side wall portion substantially parallel to the cartridge insertion direction, and an angled wall portion connected with the front wall portion and the side wall portion and angled relative to the cartridge insertion direction, wherein the tape access opening is provided at the angled wall portion of the case.

5. The tape cartridge of claim 1, further comprising an operation portion provided at the covering member, the operation portion being capable of moving the covering member in an open position direction while engaged with the opening member of the tape drive by an operation of the insertion of the tape cartridge.

6. The tape cartridge of claim 5, wherein the case comprises a window portion which enables relative engagement of the opening member of the tape drive and the operation portion at the time of insertion of the tape cartridge.

7. The tape cartridge of claim 6, wherein the window portion comprises structure such that the window portion does not physically interfere with the opening member of the tape drive and the operation member at the time of insertion of the tape cartridge, and wherein the window portion includes a long, narrow slit extending along the cartridge insertion direction.

8. The tape cartridge of claim 1, further comprising an urging element which continuously urges the covering member in a closed position direction.

9. The tape cartridge of claim 1, wherein the case is structured with an upper case and a lower case, and includes a plurality of joining portions for joining the upper case and the lower case.

10. The tape cartridge of claim 1, further comprising a leader member attached to an end portion of the tape, wherein the leader member is detachably held at a vicinity of the tape access opening.

11. A tape drive for carrying out at least one of reading and writing of data at a tape cartridge which is insertable at the tape drive, wherein the tape cartridge includes:
   a case;
   a single reel rotatably provided in the case, the reel including a first center of rotation thereof;

a tape unwindably attached to the reel;

a tape access opening provided at the case; and a covering member which is reciprocally moveable along a circular arc-form movement path between a closed position for closing the tape access opening and an open position for opening the tape access opening, the circular arc including a predetermined radius thereof from a second center of rotation, a position of the first center of rotation in a direction of insertion of the cartridge substantially coinciding with a position of the second center of rotation in the cartridge insertion direction, and wherein the tape drive includes an opening member which is capable of operably engaging with the tape cartridge at a time of insertion of the tape cartridge.

12. The tape drive of claim 11, wherein the opening member is capable of engaging with an operation portion of the covering member and moving the covering member in an open position direction at the tape cartridge insertion time.

13. The tape drive of claim 11, wherein the opening member projects in a direction intersecting the tape cartridge insertion direction.

14. The tape drive of claim 11, wherein the opening member advances into the tape cartridge at the tape cartridge insertion time.

15. The tape drive of claim 14, wherein the opening member advances through a tape cartridge window portion provided at the tape cartridge.

* * * * *